United States Patent [19]

Weinberg et al.

[11] 4,186,336
[45] Jan. 29, 1980

[54] LIMIT CYCLING REGULATOR APPARATUS FOR PLURAL PARALLEL POWER SOURCES

[75] Inventors: Alan H. Weinberg, Sassenheim; Dermot M. O'Sullivan, Leiderdorp, both of Netherlands

[73] Assignee: Organisation Europeenne de Recherches Spatiales, Paris, France

[21] Appl. No.: 887,610

[22] Filed: Mar. 17, 1978

[30] Foreign Application Priority Data

Mar. 31, 1977 [BE] Belgium.................................. 176327

[51] Int. Cl.² ............................................. G05F 1/46
[52] U.S. Cl. ........................................ 323/15; 323/17; 307/59; 307/87
[58] Field of Search .................. 307/52, 53, 59, 62, 307/87; 323/15, 8, 17

[56] References Cited

U.S. PATENT DOCUMENTS

| | | | |
|---|---|---|---|
| 3,889,177 | 6/1975 | Fendrich | 323/17 |
| 3,896,368 | 7/1975 | Rym | 307/59 |
| 3,956,687 | 5/1976 | Lindenman | 323/15 |

Primary Examiner—L. T. Hix
Assistant Examiner—S D. Schreyer
Attorney, Agent, or Firm—Hill, Van Santen, Steadman, Chiara & Simpson

[57] ABSTRACT

A low dissipation shunt or series regulator apparatus is described comprising dump switching means coupled in parallel to each power source, which dump switching means is arranged for being responsive to a control signal produced by comparator means arranged for comparing the level of the error signal with a respective reference level. Each power source has its output connected to the reference level input of the corresponding comparator through feedback circuit means in order to set two operation thresholds for the comparator, thereby allowing each dump switching means to switch cyclically between two states, a first state serving to short the corresponding power source and a second state serving to allow the power source to provide current to the load.

3 Claims, 6 Drawing Figures

LIMIT CYCLING REGULATOR APPARATUS FOR PLURAL PARALLEL POWER SOURCES

FIELD OF THE INVENTION

This invention relates to an improved shunt or series regulator apparatus for controlling the current provided to a load from a plurality of electric power sources. A typical application is the regulation of the output current of the solar cell panels on spacecrafts.

BACKGROUND OF THE INVENTION

For the purposes of this description only the shunt application will be described.

The basic principle behind the operation of a shunt regulator apparatus to be used with multiple power sources is controlling the current contribution from one or several sources depending on the load requirement. For that purpose, each power source has a shunt dump device connected thereto, said dump device being responsive to a control signal for dissipating all or a portion of the current generated by the corresponding source. Various techniques have been developped to minimise the power dissipation of the dumps. To date, three types of arrangements are available which allow the voltage or current regulation of a power source with a minimum dissipation of the dump: they all use an error amplifier for comparing the voltage on the supply bus feeding the load with a reference voltage and for producing a signal proportional to the detected deviation.

A first circuit arrangement, called analogue sequential shunt regulator, is illustrated in FIG. 1. The error signal $V_E$ is applied to a plurality of amplifier $A_i$ which are connected such as to work in respective and separate voltage ranges. Each amplifier is connected to compare the error signal $V_E$ with a respective reference level $V_i$ for producing a control signal when the error signal exceeds the reference level. The control signal from the amplifier operates the analogue dump shunt module $D_i$ associated with a distinct power source in order to dissipate a portion of or all the current generated by said source.

In this arrangement each dump shunt module should be capable of dissipating power from zero to the maximum shunt power and then again to zero before the next dump shunt module starts operating. Furthermore, regulators of this type are bulky for large powers to be regulated.

A second arrangement, called digital shunt regulator, is illustrated in FIG. 2. In this arrangement the error signal is applied to an analogue dump module $D_o$ which is arranged to dissipate the energy into an impedance $Z_o$. The voltage across the latter is compared with an upper reference voltage $V_1$ and with a lower reference voltage $V_2$ for producing two control signals which actuate a sequencer SEQ, the one control signal in the forward direction and the other control signal in the reverse direction. The sequencer can comprise a digital up/down counter. From every sequencer stage an output signal is derived for controlling switching means B connected in parallel with a power source. When the current on the bus decreases, the error signal increases as does the output voltage from the dump module $D_o$. When this output voltage reaches to upper reference level $V_1$ which is set at amplifier $A_1$, the latter produces a control signal which enables the sequencer to sequence one stage up thereby operating the switching means for shunting the power source associated with this new sequencer stage and causing the regulated current to decrease.

Depending on the state of the sequencer, one or several power sources are shunted. When the current to be dissipated decreases, the error signal decreases also and when the output voltage from the dump module $D_o$ reaches the lower reference level $V_2$ set at comparator $A_2$, the latter produces a control signal which enables the sequencer to sequence one stage down, thereby to drive the switching means OFF for allowing the corresponding power to feed its current contribution into the supply bus.

In this circuit arrangement the dump module should be capable of dissipating a maximum power equal to or greater than individual source's power. Also, any sequencer failure results in a loss in regulation. Furthermore, the sequencer is a relatively complex digital device when large power levels are involved.

The third known circuit arrangement is called multiphase pulse width modulation (PWM) shunt regulator. In this circuit arrangement the switching of the power sources is achieved by pulse width modulation. This type of arrangement is illustrated in FIG. 3. Each of the comparators $A_i$ controls switching means $B_i$ connected in parallel with a power source. One input to the comparators is the error signal $V_E$, the other input is a saw tooth waveform control signal produced by a generator G. The latter is arranged for producing phased control signals. The outputs from the comparators thus are pulses of equal duration but with a phase displacement of a fraction of a period. The switching means $B_i$ are thereby operated one after the other with a time interval therebetween.

In this arrangement the mode of operation causes current to be sequentially pumped at a given frequency into a supply bus. As the load current requirement increases, then the width of the control pulses decreases and thus overlapping of the currents occurs, which implies that the bus current has developed DC- and AC-components, the AC-component being always equal to the short-circuit current of one source. This AC-component should be filtered by a capacitor.

In this arrangement all the power sources are switching, the implication being that a failure results in the voltage ripple on the supply bus being increased. Furthermore, the control signal generator is a complex apparatus which, in case of failure, causes a loss in regulation.

SUMMARY OF THE INVENTION in view of the foregoing it is an object of the invention to provide an improved low dissipation shunt or series regulator apparatus.

Another object of this invention is to provide a low dissipation regulator apparatus which controls instantaneously the highest and lowest current, and hence the average current, directly as a function of the load voltage or current error.

Yet another object of this invention is to provide a low dissipation regulator apparatus which is inherently simple.

In accordance with this invention each power source has dump switching means coupled in parallel thereto, which dump switching means is arranged for being responsive to a control signal produced by comparator means arranged for comparing the level of the error signal with a respective reference level. Each power source has its output connected to the reference level input of the corresponding comparator through feedback circuit means in order to set two operation thresholds for the comparator, thereby allowing each dump switching means to switch cyclically between two states, a first state serving to short the corresponding power source and a second state serving to allow the power source to provide current to the load.

DESCRIPTION OF AN EMBODIMENT OF THE INVENTION.

Figure 1:
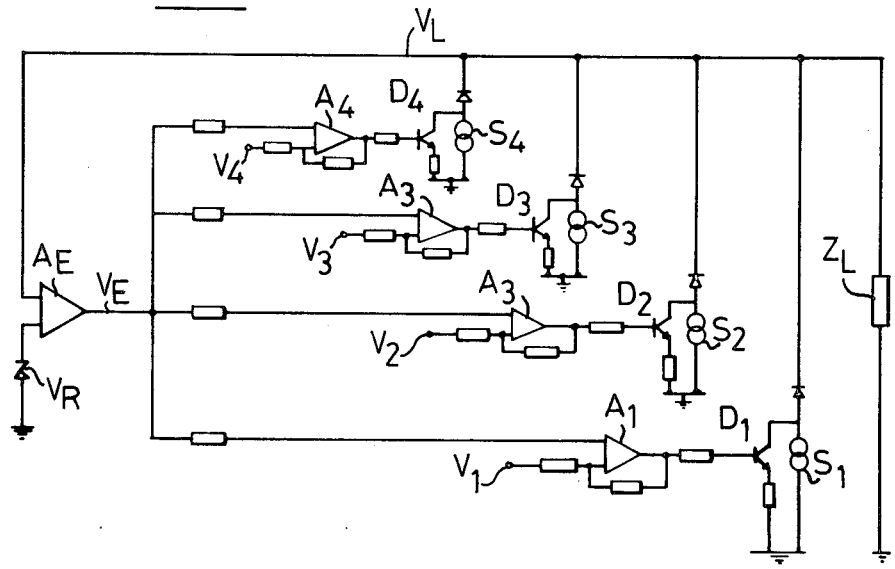
FIGS. 1 to 3 illustrate schematically three known types of shunt regulator arrangement.
Figure 2:
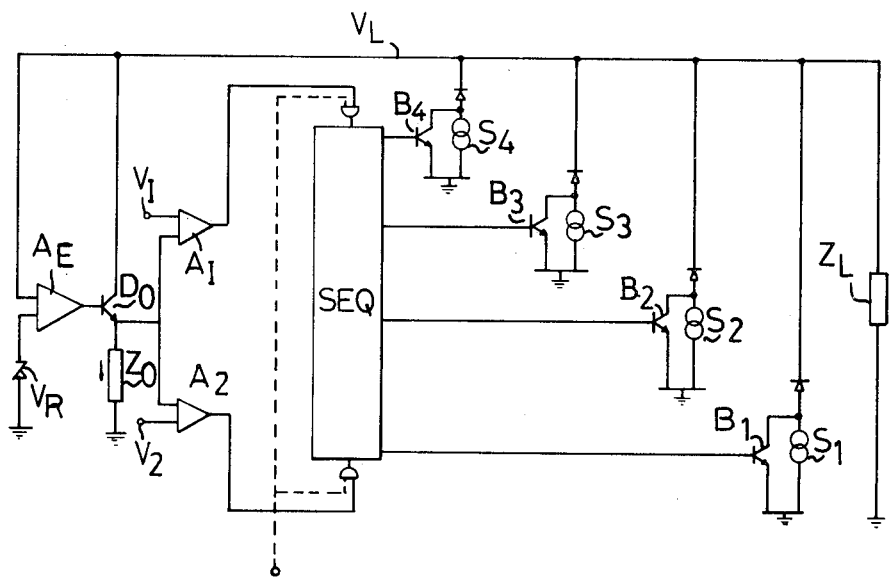
Figure 3:
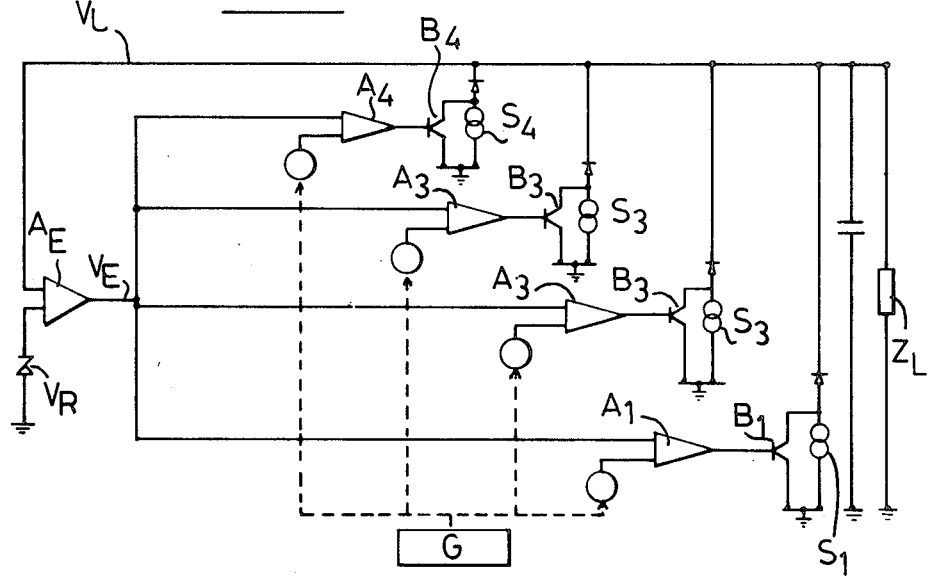
Figure 4:
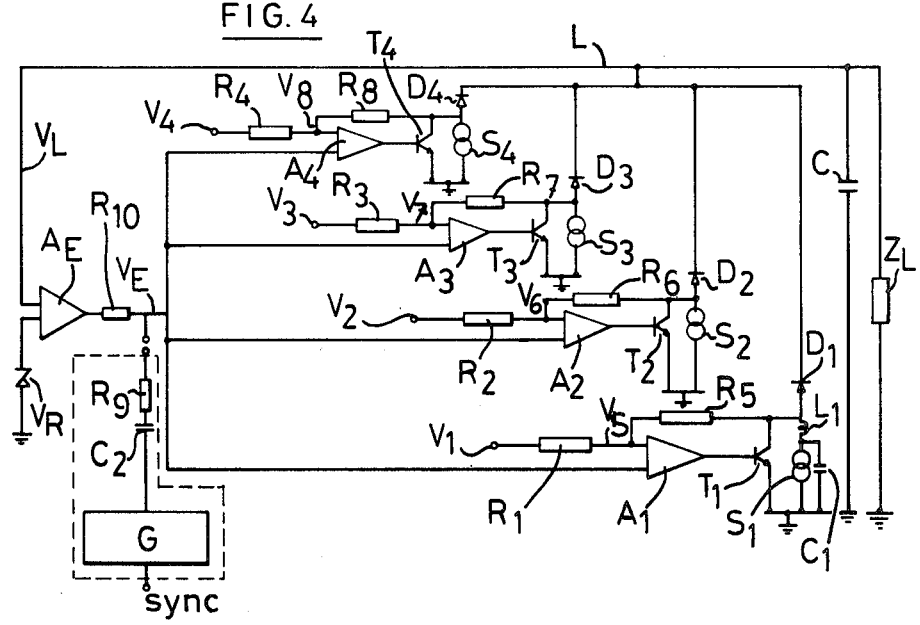
FIG. 4 is a schematic diagram of an illustrative embodiment of the circuit arrangement according to the invention.

Referring to FIG. 4 there is illustrated an embodiment in accordance with the invention which contemplates to regulate the current supplied by four power sources $S_1$–$S_4$ through blocking diodes $D_1$–$D_4$ into a supply bus L feeding a load represented by the impedance $Z_L$. Obviously the number of power sources may be different from four. Parallel connected with each power source is a dump switching device illustratively represented by one of the transistors $T_1$, $T_2$, $T_3$, $T_4$. Each of said transistors has its base electrode connected to the output of a respective comparator means $A_1$, $A_2$, $A_3$, $A_4$.

The voltage $V_L$ on the bus L is applied to a first input of an error detector-amplifier means $A_E$; a second input to the latter means has a reference voltage $V_R$ applied thereto. The error signal $V_E$ which appears at the output of amplifier $A_E$ is applied to a first input of each of the comparators $A_1$–$A_4$. The second input of each of said comparators has a respective reference voltage $V_1$, $V_2$, $V_3$, $V_4$ applied thereto through resistors $R_1$, $R_2$, $R_3$, $R_4$ respectively.

In accordance with the invention the output from each power source is connected to the second input of the corresponding comparator through a feedback circuitry comprising a resistor, $R_5$, $R_6$, $R_7$, $R_8$ respectively. Each feedback circuitry thus applies to the second input of the comparator a voltage which superimposes to the reference voltage and determines two operation thresholds for the comparator. At each of said thresholds the comparator responds to the error signal $V_E$ for producing a control signal for driving the dump device connected thereto. Consider for instance the comparator $A_1$ and in order to appreciate the manner in which the embodiment of FIG. 4 operates, attention is called to the diagram of FIG. 5. The reference voltage applied to the comparator $A_1$ is voltage $V_1$. The feedback voltage $V_5$ applied to the second input of this comparator is determined by the resistance ratio of resistors $R_5$ and $R_1$. This feedback voltage $V_5$ depends on the current drawn from source $S_1$ so that it varies between two limits $V_{5max}$ and $V_{5min}$. The comparator $A_1$ is arranged to produce transition of the output control signal when the error signal $V_E$ is above $V_{5max}$ and below $V_{5min}$.

Each of the other comparators operates in a similar manner with the following thresholds: $V_{6max}$ and $V_{6min}$ for comparator $A_2$ having reference voltage $V_2$, $V_{7max}$ and $V_{7min}$ for comparator $A_3$ having reference voltage $V_3$, and $V_{8max}$ and $V_{8min}$ for comparator $A_4$ having reference voltage $V_4$.

Figure 5:
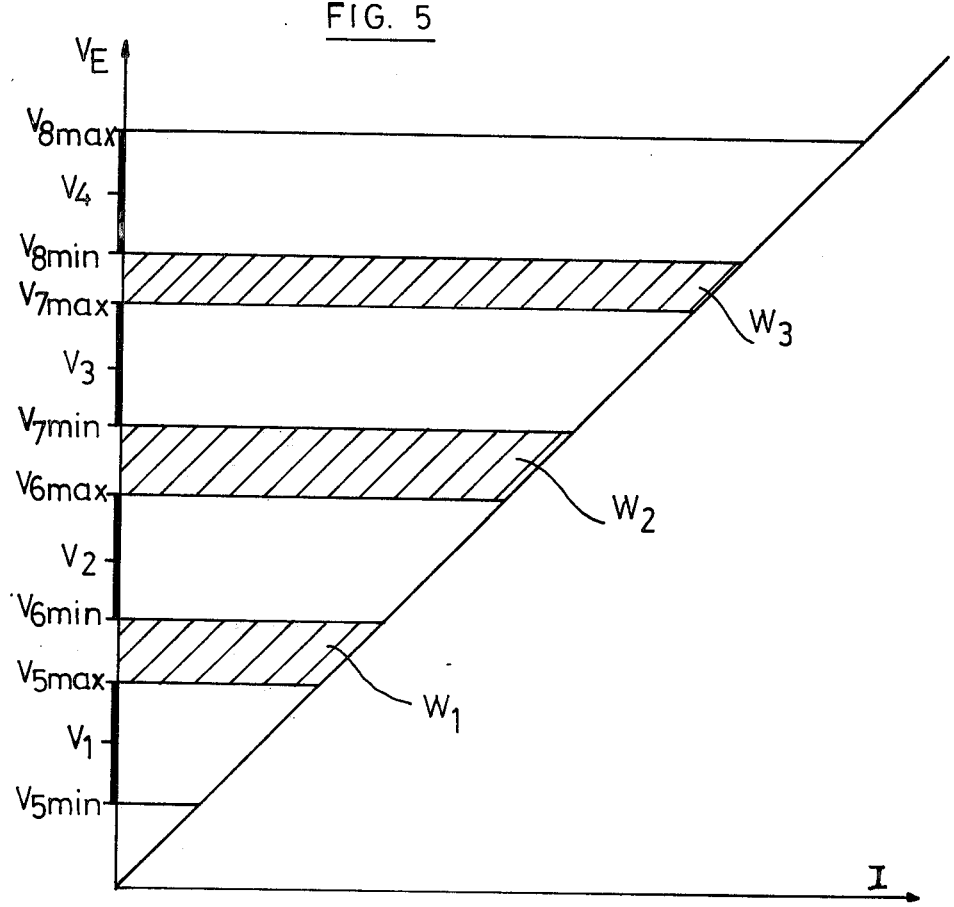
FIG. 5 is a diagram showing the variation ranges of the error signal in the arrangement of FIG. 4.

In the apparatus according to the invention, the comparators thus operate each over a respective error voltage range, the different ranges being staggered as apparent from FIG. 5. The sequential regulating process is controlled by the voltage variation of capacitor C (see FIG. 4) connected between the common output of power sources $S_1$ through $S_4$ and ground as will be apparent hereafter.

On start up the current on the supply bus L is kept unregulated until the net current exceeds the value $V_L/R$, where R denotes the resistance of the load $Z_L$ connected to the bus L.

The error signal $V_E$ then is small and sufficient to produce a control signal at the comparators output. In this condition the four damp transistors $T_1$ through $T_4$ are in blocking state and the four power sources $S_1$ through $S_4$ are feeding into the bus L. The capacitor C is thereby loaded with the total current drawn from the four power sources.

As soon as the current on the supply bus L exceeds the value $V_L/R$, the voltage V on the bus tends to rise whereby the error signal $V_E$ increases until the upper voltage threshold $V_{5max}$ of comparator $A_1$ is reached. Should the current on the bus remain at this level, the output from comparator $A_1$ enables dump transistor $T_1$ in conducting state, thereby shorting out the power source $S_1$ and thus removing that source's contribution to the bus current. The feedback voltage $V_5$ then instantaneously changes from its upper threshold $V_{5max}$ to its lower one $V_{5min}$, thus the dump transistor $T_1$ is latched ON and the source $S_1$ is kept off.

In this state, the removal of $S_1$ source's contribution to the bus current results in insufficient current being available on the bus, thus causing the capacitor C being discharged and the voltage across said capacitor to fail. This fall in voltage is amplified by the amplifier $A_E$, causing the error signal $V_E$ to progress from the upper threshold $V_{5max}$ to the lower threshold $V_{5min}$. On arriving at that lower threshold $V_{5min}$, the comparator $A_1$ switches back to its upper threshold $V_{5max}$, thereby blocking transistor $T_1$ and allowing the power source $S_1$ to feed again into the bus. This "limit cycling" process will continue as described above, resulting in the error signal to cycle between the voltage thresholds $V_{5max}$ and $V_{5min}$ as long as the current demand on the bus is in the range $3I_p$ to $4I_p$ where $I_p$ represents the current contribution from each source $S_1$. The additional current drawn from source $S_1$ into the bus thus oscillates at a frequency which is determined by the capacitance of capacitor C and the contribution current $I_p$ which the source $S_1$ is capable to provide. When the bus current continues to increase, either by the load being reduced on one source's current contribution $I_p$ being increased, the shorting out of source $S_1$ no longer causes a discharge or capacitor C since the latter will continue to charge. Thus the error signal $V_E$ increases past the upper voltage threshold $V_{5max}$ of comparator $A_1$ until it reaches the upper threshold $V_{6max}$ of comparator $A_2$. The latter produces a control signal which enables the dump transistor $T_2$ in conducting state, thereby resulting in the $S_2$ source's contribution to the bus current being removed. The cycling of the error signal $V_E$ will then occur as described above but this time between the voltage thresholds $V_{6max}$ and $V_{6min}$.

During this cycle in the regulation process the source $S_1$ is permanently shorted and it is the current drawn from source $S_2$ which oscillates on the bus. A further increase in the bus current will sequence the limit cycling to the range extending between the thresholds $V_{7max}$ and $V_{7min}$, which results in the current contribution from source $S_3$ being oscillated while sources $S_1$ and $S_2$ are shorted.

Yet a further increase in the bus current sequences the limit cycling to the range extending between the thresholds $V_{8max}$ and $V_{8min}$, which results in the current contribution from source $S_4$ being oscillated while sources $S_1$, $S_2$ and $S_3$ are shorted out.

Thus the bus regulation is achieved by the limit cycling regulation of one source's contribution to the bus current, all other sources being either ON or OFF and this regulation operates to control instantaneously the highest and lowest current, and hence the average current directly as a function of the error signal. It should be stressed that the regulator apparatus according to this invention permits a proportional control of the bus current under all load conditions.

On the pictorial representation of this limit cycling as shown in FIG. 5 it can be seen that the operation ranges of the comparators are separated by dead bands $W_1$, $W_2$, $W_3$. It is to be noted that the operation ranges may overlap on the condition that the maximum and minimum threshold of two consecutive comparators are in alternate relationship.

Figure 6:
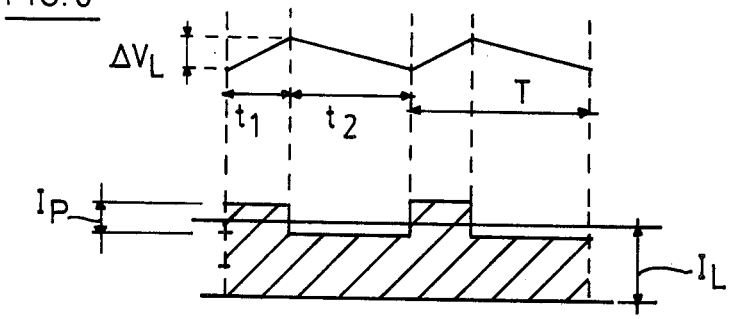
FIG. 6 are waveforms illustrating the variation of the regulated voltage and of the supply bus current.

As a result of the limit cycling regulation in accordance with this invention, the variation cycle of the bus voltage $V_L$ exhibits a voltage ripple which is determined by the charging time constant $t_1$ and the discharging time constant $T_2$ of capacitor C as illustrated in FIG. 6. The voltage ripple amplitude thus is virtually independent of the load current or source currents. The current on the supply bus has an AC-component $I_p$ and a DC-component $I_L$. The AC-component and the DC-component are directly applied to the load. In order to block the voltage ripple induced on the power sources one can connect a filter arrangement. FIG. 4 shows a filter arrangement for source $S_1$ comprising illustratively the inductor $L_1$ and the capacitor $C_1$.

In the circuit arrangements as described in the foregoing a periodic signal generator, e.g. a sawtooth generator, can be coupled at the output of the error detector AE in order to drive the switching transistors $T_1$ with pulses having a width varying as a function of the average value of the error signal $V_E$. In FIG. 4 there is shown generator G coupled to the output of amplifier $A_E$ through capacitor $C_2$ and resistor $R_9$. The frequency of G generator signal sets the switching frequency of either of transistors $T_i$; however the conduction time of these transistors varies as a function of the average value variation of the error signal $V_E$. This results in an effective sequential Pulse-width-modulation control of each dump individually with all other dumps either on or off.

An alternative arrangement to achieve the same function can be obtained by deleting resistors $R_5$, $R_6$, $R_7$ and $R_8$ of FIG. 4 and by introducing a separate sawtooth generator $G_i$ to each comparator, having the same peak-to-peak amplitude as the original feedback values $V_{imax}$ and $V_{imin}$, e.g. $V_{5max}$ and $V_{5min}$ for generator $G_1$ associated to comparator $A_1$.

What is claimed is:

1. A shunt or series regulating apparatus for controlling the current supplied to a bus line from a plurality of power sources, said apparatus comprising:
    error detector means having an input connected to the bus line for comparing the bus voltage to a reference voltage and producing an error signal representing the deviation of said bus voltage from the reference voltage;
    a plurality of dump switching means each connected in parallel with a respective power source, each of said dump switching means having an ON and an OFF state and being responsive to a control signal for switching from its OFF state to its ON state thereby to shunt the current delivered by said power source to the bus line;
    a plurality of comparator means each associated to a respective power source, each of said comparator means having a first input connected to the output from said error detector means and a second input connected to a respective reference voltage level, each of said comparator means having its output connected to the control input to a respective of said dump switching means for applying a control signal thereto which is proportional to the difference between the said error signal and the said reference voltage level;
    a plurality of positive feedback circuit means each connected between the output of the respective power source and the second input to the corresponding comparator means for superimposing a signal to the reference voltage level, thereby to set two operation thresholds for the said comparator means, such that each dump switching means is allowed to switch cyclically between its two states, thereby to allow the current from the corresponding power source to be fed into the bus line when the dump switching means is OFF and to short the power source when the dump switching means is ON; and
    capacitor means connected between the bus line and the ground in order that its charge follows at any time the variation of the total current drawn from the plurality of power sources into the bus line such that one of said switching means at a time is caused to switch cyclically between its two states and such that said switching means are caused to switch cyclically one after another as the value of said error signal is increasing.

2. A shunt or series regulator apparatus according to claim 1, wherein a periodic signal generator is coupled to the output from the error detector means for applying to the dump switching means control pulses having a width which varies as a function of the average value of the error signal.

3. A shunt or series regulator apparatus according to claim 1, wherein a separate sawtooth generator is associated to each comparator means, having a peak-to-peak amplitude equal to the operation thresholds of the respective comparator means.

* * * * *